United States Patent Office 3,586,568
Patented June 22, 1971

3,586,568
PROCESS FOR BONDING ELASTOMERIC
MATERIALS TO METALS
Donald H. Campbell, Niagara-on-the-Lake, Ontario, Canada, assignor to Hooker Chemical Corporation, Niagara Falls, N.Y.
No Drawing. Filed July 26, 1967, Ser. No. 656,071
Int. Cl. C09j 5/02
U.S. Cl. 156—308
8 Claims

ABSTRACT OF THE DISCLOSURE

A process for bonding an elastomeric material to a metal surface wherein the metal surface is treated with a mixture of chromic acid and phosphoric acid, the elastomeric material is placed in contact with the thus-treated surface and a moderate pressure is applied to effect the bonding. The chromic-phosphoric acid solution used may also contain an inert filler, such as titanium dioxide and desirably contains the chromic and phosphoric acid in equal concentrations. The acid solution is applied so as to leave from about 20 to 300 milligrams per square foot of dry coating on the metal surface, although the coating is not permitted to dry completely before the application of the elastomeric material. Numerous natural and synthetic rubbers can thus be bonded to surfaces of steel, aluminum, or zinc by this method.

---

This invention relates to a method for bonding elastomeric materials to metal surfaces and more particularly it relates to a process whereby various natural and synthetic rubbers may be bonded to different types of metal surfaces without the use of conventional adhesives.

In the past, various techniques have been used for bonding elastomeric materials, such as natural and synthetic rubbers, to metal surfaces. Generally, all of these methods have utilized some type of adhesive which is applied either to the surface of the elastomer or to the metal surface, or both. Inasmuch as these elastomer-metal laminates are principally used as shock absorbing or mounting members wherein advantage is taken of the flexibility of the rubber and the strength of the metal, the bond between the elastomer and metal surface must be one which will withstand these repeated flexing, twisting and vibrating forces without rupture. For this reason, a great deal of effort has gone into the development of various adhesive materials which will provide the necessary bond between the elastomer and metal surface. In addition to the formulation of different adhesive compositions, this work has also involved different ways of conditioning both the elastomer and the metal surface so as to make them more receptive to the adhesives which are used.

Although numerous compositions and processes have been developed, many of which are presently in commercial use, for the most part, these are all subject to some difficulty. For example, many of the adhesive compositions used require special handling techniques, or may be formulated from relatively expensive materials and/or may have an undesirably short shelf life. Additionally, in many instances, changes in the type of elastomer and/or metal surfaces which are being bonded frequently necessitate a change in the adhesive and/or surface preparation techniques which are used. Accordingly, up to the present time there has not been developed a method for bonding elastomers to metal surfaces which is easily carried out and which may be used on a variety of elastomers and metal surfaces.

It is, therefore, an object of the present invention to provide an improved process for bonding elastomer materials to metal surfaces.

A further object of the present invention is to provide an improved process for bonding elastomers and metal surfaces which may be easily carried out using relatively inexpensive materials as the bonding agents.

These and other objects will become apparent to those skilled in the art from the description of the invention which follows.

Pursuant to the above objects, the present invention includes a process for bonding an elastomeric material to a metal surface which comprises applying to the metal surface a layer of an aqueous coating mixture containing chromic acid and phosphoric acid, providing moisture on the thus-coated metal surface so as to have thereon water in an amount of at least about 4% by weight of the coating on the surface, placing the elastomeric material in contact with the thus-treated, moist surface and applying sufficient pressure to effect bonding of the elastomer to the metal surface.

The process of the present invention has been found to be suitable for use with ferrous metal surfaces, aluminum surfaces and zinc surfaces, including alloys which are more predominantly of these metals. Additionally, the natural and synthetic rubbers are typical of the elastomers which may be bonded to these surfaces, with the sulfuric acid treated natural rubber and synthetic rubbers such as neoprene, SBR, butyl, ethylene-propylene-diene monomer, and Thiokol, being particularly suitable.

More specifically, in the practice of the present invention, the aqueous coating solution which is applied to the metal surface desirably contains $CrO_3$ in an amount within the range of about 4 to about 35% and $H_3PO_4$ in an amount within the range of about 4 to about 35%. Preferably, the $CrO_3$ is present in the coating mixture in an amount within the range of about 6 to about 30%, while the $H_3PO_4$ is present in an amount within the range of about 6 to about 30%. In many instances, it has been found to be desirable to use solutions in which the $CrO_3$ and the $H_3PO_4$ are present in substantially equal amounts by weight. It is to be appreciated, however, that the aqueous coating mixtures used may contain the $CrO_3$ and the $H_3PO_4$ in a weight ratio of $CrO_3$ to $H_3PO_4$ within the range of about 0.5:1 to about 2:1.

In addition to the chromic acid and phosphoric acid, the aqueous coating mixtures used also desirably contain an inorganic filler material, which material may be present in the composition in amounts within the range of about 1 to 40% by weight, with amounts within the range of about 15 to 25% being preferred. Exemplary of such filler materials which may be used are titanium dioxide, colloidal silica, Attapulgus clay, aluminum metal powder, zinc metal powder, and the like. Additionally, it has been found that metal salts of organic fatty acids, such as zinc stearate, lead acetate, sodium acetate, and the like, may also be used. Accordingly, for purposes of the present invention, materials of this latter type will also be considered as being inorganic filler materials. In a most preferred embodiment, the aqueous coating mixture for use in the present method contains about 8% by weight $CrO_3$, about 8% by weight $H_3PO_4$, and about 20% by weight titanium dioxide.

The aqueous coating mixture may be applied to the metal surface in any convenient manner, as for example by roller coating, spraying, flowing, immersion, and the like. In many instances, because of the nature of the facilities used in effecting the bonding of the elastomeric materials to the metal surfaces, spray and roller coating applications are preferred, so that primary reference hereinafter will be made to these application techniques. The temperature of the acidic coating solution applied using these techniques, has not been found to be critical. Accordingly, temperatures from room temperature, e.g. about 20 degrees centigrade, up to the boiling point of the solutions may be used. Desirably, with the coating mixtures used, the coating techniques are carried out such that a coating weight of from about 20 to 300 milligrams per square foot, and preferably from about 50 to 200 milligrams per square foot is formed on the metal surface. In some instances, in order to obtain a more evenly distributed coating on the metal surface, it may be desirable to pass the coated surface through one or more leveling rolls or similar spreading devices after the application of the coating mixture.

Following the application of the chromic-phosphoric acid coating mixture to the metal surface, any excess coating materials are desirably removed from the surface and moisture is provided on the thus-coated surface so that the surface contains water in an amount of at least about 4% by weight of the coating on the surface. Desirably, the moisture will provide water on the surface in an amount within the range of about 4 to about 50 percent by weight of the coating, although greater amounts may also be used. This provision of water on the surface may be effected in any convenient manner and will depend upon the conditions under which the coating has been applied. Thus, for example, where the coating is applied under conditions of relatively high humidity, no additional moisture may be needed or it may even be desirable to remove water from the surface so as to bring the water content within the desired 4 to 50% by weight range. In the latter instance, this may be done by drying the surface in any convenient manner, as for example by passing heated air over the surface. Where the coating has been applied under conditions of low humidity, however, water may have to be added to the surface in order to bring the water content up to the desired minimum of 4% by weight. Here again, the addition of water to the surface may be affected in any convenient manner, as for example, by contacting the surface with moist air or steam.

After providing the desired moisture on the surface, the elastomeric material is placed in contact with the moist, coated metal surface. As has been noted hereinabove, the elastomeric material used may be any of the various natural and synthetic rubbers, generally in the form of sheets or strips of these materials. The thickness of the elastomeric material which is applied will, of course, depend upon the intended end use of the bonded metal-elastomer article. Thus, for example, elastomeric materials thickness from a millimeter or even less, to 10 to 20 centimeters or more, may be bonded to metal surfaces using the present method.

Once the elastomeric material is placed in contact with the moist, coated metal surfaces, sufficient pressure is applied to effect the formation of a bond between the elastomer and the metal surface. Normally, the amount of pressure applied will be insufficient to effect any substantial, permanent deformation of either the elastomeric material or the metal to which it is applied. Typical pressures which may be used are found to be within the range of about 1 to 500 pounds per square inch. The application of the desired pressure to effect the bonding may be done at ambient temperatures, e.g., room temperature, or at elevated temperatures, if desired. Where elevated temperatures are used, these will not be sufficient to effect any appreciable softening of the elastomeric material. Typical elevated temperatures which may be used are within the range of about 100 to 200 degrees centigrade.

The metal-elastomer assembly will be maintained under pressure for a period sufficient to effect the desired bonding. Generally, this time will vary, depending upon the materials used, as well as the amount of pressure applied and the tempeatures which are used. In general, it has been found that when the bonding is carried out under elevated temperatures, times of from a few seconds to several minutes may be sufficient to effect the bonding while at room temperature, the same pressures may require as long as 24 hours to attain a suitable bond. It is, of course, to be further appreciated that the present method may be utilized to effect the bonding of the elastomeric material to a single metal surface as well as to effect bonding of the elastomeric material between two metal surfaces, including the formation of laminated structures made of alternating layers of metal and elastomer. In each case, it is sufficient to apply the acidic coating mixture to each metal surface which is to be placed in contact with the elastomeric material and thereafter, applying sufficient pressure to the thus-formed assembly so as to effect the formation of the desired bond between the metal surfaces and the elastomer.

In order that those skilled in the art may better understand the present invention and the manner in which it may be practiced, the following specific examples are given. In these examples, unless otherwise indicated, temperatures are in degrees centigrade and parts and percents are by weight. It is to be appreciated, however, that these examples are merely exemplary of the present invention and are not to be taken as a limitation thereof.

EXAMPLE 1

A coating solution was prepared containing the following components in the amounts indicated:

| Components: | Percent by weight |
|---|---|
| $CrO_3$ | 8 |
| $H_3PO_4$ | 8 |
| $TiO_2$ | 20 |
| Water | 64 |

This coating mixture was applied to two 1 inch by 3 inch strips of 24 gauge cold rolled steel. A piece of SBR rubber having a thickness of about ⅛ inch was then placed between the moist strips and moderate pressure was applied to the assembly by means of a clamp. Upon opening the clamp after 16 hours, it was found that the rubber was very strongly bonded to both of the metal surfaces, to the extent that the rubber itself tore when it was attempted to pull the pieces apart.

By way of comparison, the above procedure was repeated using similar metal strips but which had not been treated with the aqueous coating mixture. In this instance, after the SBR rubber had been clamped between the strips for 16 hours, there was found to be no bonding of the rubber to either of the metal surfaces.

EXAMPLE 2

The procedure of Example 1 was repeated several times, using neoprene rubber, butyl rubber and Thiokol rubber in place of the SBR Rubber. In each instance, similar bonding of the rubber material to both of the steel strips was obtained.

EXAMPLE 3

The procedure of Examples 1 and 2 was repeated, using aluminum strips and temper-rolled hot dip galvanized strips in place of the cold rolled steel strips. As in the preceding examples, in each instance, similar bonding of the rubber material to each of the metal surfaces was obtained.

EXAMPLE 4

The procedure of Example 1 was repeated using an uncured butyl rubber, in place of the SBR rubber of Example 1. Additionally, after the uncured butyl rubber was placed between the cold rolled steel strips and pressure applied to the assembly by means of a clamp, the entire assembly was heated at 150 degrees for 30 minutes. Upon releasing the clamp after this time, similar bonding of the rubber to each of the metal surfaces, as in Example 1, was obtained.

EXAMPLE 5

The procedure of Example 4 was repeated with the exception that cured butyl rubber and SBR rubber were used in place of the uncured butyl rubber of the preceding example. In each instance, after heating the steel strip-rubber assembly for 30 minutes at 150 degrees centigrade, while pressure was applied thereto, similar bonding of the rubber materials to each of the steel strips was obtained.

EXAMPLE 6

The procedure of Example 1 was repeated with the exception that the coating solution used had the following composition:

| Components: | Percent by weight |
|---|---|
| $CrO_3$ | 12 |
| $H_3PO_4$ | 8 |
| $TiO_2$ | 20 |
| Water | Balance |

This composition was applied to cold rolled steel test panel by roller coating. Without completely drying the panel, a ¼ inch of neoprene rubber was placed on the moist coating and the two surfaces were pressed together in a heated press, at 100 degrees centigrade, for 1 minute. The pressure used was sufficient to ensure good contact between the metal and rubber without substantial deformation of the rubber. After removing the panel from the press, the rubber was found to be firmly bonded to the metal.

EXAMPLE 7

The procedure of Example 6 was repeated with the exception that the following composition was used.

| Components: | Percent by weight |
|---|---|
| $CrO_3$ | 25 |
| $H_3PO_4$ | 25 |
| $H_2O$ | Balance |

As in the preceding example, after removing the panel from the press, the rubber was firmly bonded to the metal.

EXAMPLE 8

The procedure of Example 6 was repeated with the exception that the following composition was used:

| Components: | Percent by weight |
|---|---|
| $CrO_3$ | 25 |
| $H_3PO_4$ | 25 |
| Anhydrous, particulate, colloidal silica (sold under the trademark "Cab-O-Sil" by the Cabot Corp.) | 6 |
| Water | Balance |

This composition, as a gel, was applied to the steel panel by wiping. Neoprene rubber strip was bonded to the panel as in Example 6 and after removing the panel from the press the rubber was found to be firmly bonded to the metal.

EXAMPLE 9

The procedure of Example 8 was repeated with the exception that the following composition was used:

| Components: | Percent by weight |
|---|---|
| $CrO_3$ | 25 |
| $H_3PO_4$ | 25 |
| $TiO_2$ | 10 |
| Anhydrous, particulate, colloidal silica (sold under the trademark "Cab-O-Sil" by the Cabot Corp.) | 6 |
| Water | Balance |

As in the preceding example, after removing the panel from the press, the rubber was found to be firmly bonded thereto.

While there have been described various embodiments of the invention, the compositions and methods described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A process for bonding elastomeric material to a metal surface which comprises applying to the metal surface a layer of an aqueous coating mixture containing chromic acid and phosphoric acid, retaining said layer on the surface, providing moisture on the thus-coated surface such that the surface contains at least about 4% by weight of the coating on the surface of water, placing an elastomeric material in contact with the moist, thus-treated surface and applying sufficient pressure thereto to effect bonding of the elastomeric material to the metal surface.

2. The method as claimed in claim 1 wherein the aqueous coating mixture contains $CrO_3$ in an amount within the range of about 4 to about 35% by weight and $H_3PO_4$ in an amount within the range of about 4 to about 35% by weight.

3. The method as claimed in claim 2 wherein the aqueous coating mixture also contains an inorganic filler material in an amount within the range of about 1 to about 40% by weight of the coating mixture.

4. The method as claimed in claim 3 wherein the inorganic filler material is titanium dioxide.

5. The method as claimed in claim 4 wherein the aqueous coating mixture is applied to the metal surface in an amount sufficient to provide a coating weight thereon within the range of about 20 to 300 milligrams per square foot.

6. The method as claimed in claim 5 wherein the elastomeric material which is bonded to the metal surface is selected from the group consisting of natural rubber and synthetic rubbers.

7. The method as claimed in claim 6 wherein the aqueous coating mixture contains from about 6 to 30% $CrO_3$, from about 6 to 30% $H_3PO_4$ and from about 10 to 30% titanium dioxide.

8. The method as claimed in claim 7 wherein the bonding of the elastomeric material to the metal surface is carried out at a pressure within the range of about 1 to about 500 pounds per square inch and a temperature within the range of about 20 to about 150 degrees centigrade.

References Cited

UNITED STATES PATENTS 3,455,775 7/1969 Pohl et al. _____ 156—307X

FOREIGN PATENTS 972,072 10/1964 Great Britain _____ 156—308

OTHER REFERENCES

Yonezaki et al.: Chem. Abs., vol. 55, p. 20730 (1961).

LELAND A. SEBASTIAN, Primary Examiner

U.S. Cl. X.R.

117—49; 156—316; 161—225